United States Patent [19]

Cochimin

[11] Patent Number: 5,704,717
[45] Date of Patent: Jan. 6, 1998

[54] BEARING SUPPORT FOR ROTARY MACHINE

[75] Inventor: Jimmy Cochimin, Fort Wayne, Ind.

[73] Assignee: Franklin Electric Co., Inc., Bluffton, Ind.

[21] Appl. No.: 715,047

[22] Filed: Sep. 17, 1996

[51] Int. Cl.⁶ .............................. F16C 35/02; H02K 5/15
[52] U.S. Cl. ......................... 384/215; 310/87; 384/296
[58] Field of Search .................................. 384/204, 202, 384/215, 295, 220, 222, 296; 310/90, 87

[56] References Cited

U.S. PATENT DOCUMENTS

| 3,604,765 | 9/1971 | Babcock | 384/220 X |
|---|---|---|---|
| 3,777,194 | 12/1973 | Schaefer et al. | 310/87 |
| 3,842,298 | 10/1974 | Schaefer | 310/87 |
| 3,873,861 | 3/1975 | Halm | 310/43 |
| 4,042,847 | 8/1977 | Jensen | 310/87 |
| 4,281,973 | 8/1981 | Meneghello | 417/424 |
| 4,357,552 | 11/1982 | MacMillan | 384/215 X |
| 4,558,246 | 12/1985 | Tokumitsu | 310/87 |
| 4,585,966 | 4/1986 | Nishida et al. | 310/87 |
| 4,684,837 | 8/1987 | Schaefer et al. | 310/87 |
| 4,756,249 | 7/1988 | Hardin | 384/215 X |
| 4,780,953 | 11/1988 | Wheeler et al. | 29/596 |
| 4,783,608 | 11/1988 | Gruber et al. | 384/296 X |
| 5,192,137 | 3/1993 | Renard | 384/296 X |
| 5,237,228 | 8/1993 | Fries | 310/87 |
| 5,367,214 | 11/1994 | Turner, Jr. | 310/87 |
| 5,378,121 | 1/1995 | Hackett | 417/363 |
| 5,428,256 | 6/1995 | Schloss | 310/87 |
| 5,436,515 | 7/1995 | Ide | 310/90 |
| 5,459,190 | 10/1995 | Nakamura et al. | 524/443 |
| 5,480,290 | 1/1996 | Zelder | 417/366 |
| 5,490,319 | 2/1996 | Nakamura et al. | 524/443 X |

FOREIGN PATENT DOCUMENTS

1273391  8/1990  Canada.

Primary Examiner—Thomas R. Hannon
Attorney, Agent, or Firm—Marshall, O'Toole, Gerstein, Murray & Borun

[57] ABSTRACT

This disclosure relates to bearing support comprising a relatively rigid collar ring for direct support of a bearing. The relatively rigid collar ring is press fit inside a bearing supporting hub of a nonmetal (such as a composite polymer) bearing support. The design of the relatively rigid collar ring and the composite polymer bearing support is such that the stresses in the construction are satisfactory for long-term performance and reliability. The bearing supporting hub includes discrete supporting hub panels and there are axial slots between the hub panels. The supporting hub panels further include radial rib sections extending axially for strengthening the supporting hub panels and for adding support for the relatively rigid collar ring. The inside diameter of the supporting hub panels is tapered to provide stress relief clearance. Contacts between the inside of the supporting hub panels and the collar ring are limited to discrete locations. Contacts between the ribs of the supporting hub and the collar ring are also discrete by nature of the discrete radial ribs. The relatively rigid collar ring also provides a flat surface for bearing a thrust load.

24 Claims, 5 Drawing Sheets

BEARING SUPPORT FOR ROTARY MACHINE

FIELD AND BACKGROUND OF THE INVENTION

This invention relates to bearing supports, and more particularly to a supporting structure for a rotary bearing of an electric machine such as an electric motor.

A typical motor includes a rotor on a rotor shaft, and end bells (also called end plates or end shields) are commonly used at both ends of the motor to support the bearings for the shaft. The bearings are often press fit or slip fit into a bearing support cavity of the end bell. Typical end bells are made of a metal material and therefore the resulting dimensions are normally very precise and stable. In addition, most motors are for above-the-ground use and are cooled by air. For this kind of above-the-ground motor, moisture effect is not a major concern for maintaining the tight tolerance and long-term stability of the bearing support.

For submersible motors, however, which are often filled with the surrounding liquid such as water, the liquid may have a significant effect on the dimensional stability of the bearings and supports. This is especially true when the motor part which supports the bearing is made of a nonmetal such as composite polymer.

Motor shaft bearings can be either roller bearings or journal bearings, and there are numerous commercially available bearings for use with motors. In particular, journal or sleeve bearings made of carbon are extensively used in submersible motors and pumps. Because of the low modulus and low thermal expansion rate of a carbon bearing, its dimensions are especially sensitive to any dimensional change of its support.

Although some composite polymers have been used as journal bearings, in particular for short life or lightly loaded applications, use of a composite polymer as a bearing support mechanism is a totally different kind of application. Further, a composite polymer support, when coupled with the use of carbon bearings, presents an engineering challenge to achieve long-term bearing stability and product reliability.

Composite polymers are dramatically different from any metal material in that their material properties and long-term dimensional stability continue to decrease in time. They have a high thermal expansion rate and substantial water absorption ability. When submerged in a liquid, some composite polymers can quickly react with the liquid and lose their mechanical characteristics. Some others may even undergo a chemical transition and become a different material over time. As a result the bearing retaining ability of a bearing support made of a composite polymer could disappear in time, and the bearing could become loose, free to float and malfunction.

One prior design of an end bell included a machined metal bearing support in conjunction with a composite polymer end plate. In essence, such a design still relies upon a metal member to support the bearing. In addition to the cost of the metal bearing support, the combination of the two parts also adds cost. In this construction, composite polymer was only used as an outer cover to take the benefit of its better corrosion resistance.

Another possible design is to press a metal ring over the outside diameter of a composite polymer supporting hub for a bearing support, and rely on the metal ring to squeeze the composite polymer and prevent it from outward growth. Such a design basically constrains the natural tendency of outward dimensional growth of composite polymers due to either thermal or moisture expansion. However, in reality it actually reverses the direction of growth, i.e. instead of expanding outward, the sandwiched composite polymer is now forced to expand inward toward the center of the shaft. The result is the build up of high stresses in the sandwiched construction and the changing of bearing dimensions as a function of both the environmental factors and the thickness relationships between the sandwiched parts.

One slight improvement can be made to the above sandwiched construction by precision machining of the bearing support hub inside diameter after the metal ring has been pressed over the outside diameter of the hub. Such an approach adds manufacturing cost although it somewhat reduces the high stresses in the sandwiched construction. However, this does not solve the high stress problem, or the bearing dimension changes because of the environmental influences such as heat and moisture.

Most composite polymers have material strengths much lower than metal such as steel. Furthermore due to creep and relaxation and degradation of material properties over time, the recommended long-term allowable stress level for composite polymers is usually a small fraction of their published material strength. This natural decay of composite polymers causes the above-discussed sandwiched design approach to become practically prohibitive due to the widespread high stresses unavoidable in the sandwiched construction.

An objective of the present invention is to provide a bearing support utilizing a composite polymer in order to capitalize the benefits, such as better corrosion resistance, that composite polymers can offer, while avoiding the widespread high stresses as described above and maintaining close tolerances and long-term stability.

It is a further objective of the present invention to minimize the dimensional changes of the bearing support mechanism due to environmental factors such as temperature variations and moisture absorption, in order to achieve long-term service reliability.

SUMMARY OF THE INVENTION

A bearing support constructed in accordance with the present invention comprises a relatively rigid collar ring for direct support of a carbon journal bearing. The relatively rigid collar ring is press fit inside a bearing supporting hub of a composite polymer bearing support. The design of the relatively rigid collar ring and the composite polymer bearing support is such that the stresses in the construction are satisfactory for long-term performance and reliability.

To this end, the composite polymer bearing supporting hub is divided and composed of discrete supporting hub panels and there are axial slots between the hub panels. The composite polymer supporting hub panels further include radial ribs extending axially for strengthening the supporting hub panels and for adding support for the relatively rigid collar ring. The inside diameter of the supporting hub is tapered to provide stress relief clearance. Contacts between the inside of the supporting hub panels and the collar ring are limited to discrete locations. Contacts between the ribs of the supporting hub and the collar ring are also discrete by nature of the discrete radial ribs.

The relatively rigid collar ring also provides a flat surface for bearing a thrust load.

At the discrete contact points the dimensional growth of the composite polymer supporting hub will be away from the relatively rigid collar ring and thus result in minimum to no dimensional change of the collar ring or the bearing contained inside of it. The dimensional growth of the composite polymer elsewhere will follow its natural course but will not affect the dimension and stability of the bearing. Thus a low stress and dimensionally stable bearing support mechanism is achieved utilizing a composite polymer bearing support.

BRIEF DESCRIPTION OF THE DRAWINGS

The foregoing and other objects and advantages of the present invention will be apparent from the following detailed description taken in conjunction with the accompanying figures of the drawings wherein.

DETAILED DESCRIPTION OF THE INVENTION

While the drawings and the accompanying description relate to a submersible motor for driving a pump, for example, it will be obvious that the present invention has other useful applications.

Figure 1:
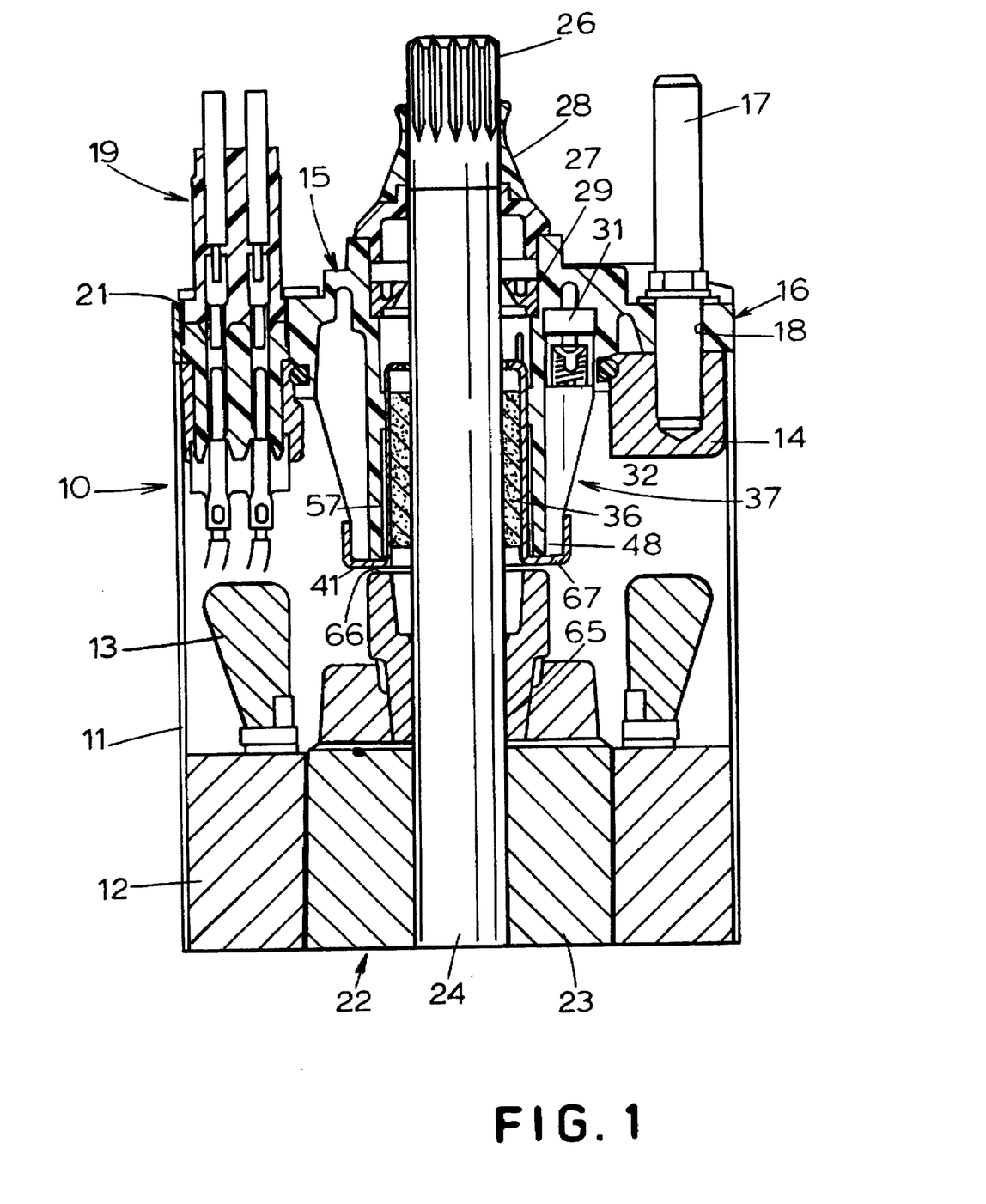
FIG. 1 is a sectional view showing a one-piece nonmetal top end bell assembly for supporting a bearing and a bearing collar ring, according to the present invention.
Figure 2:
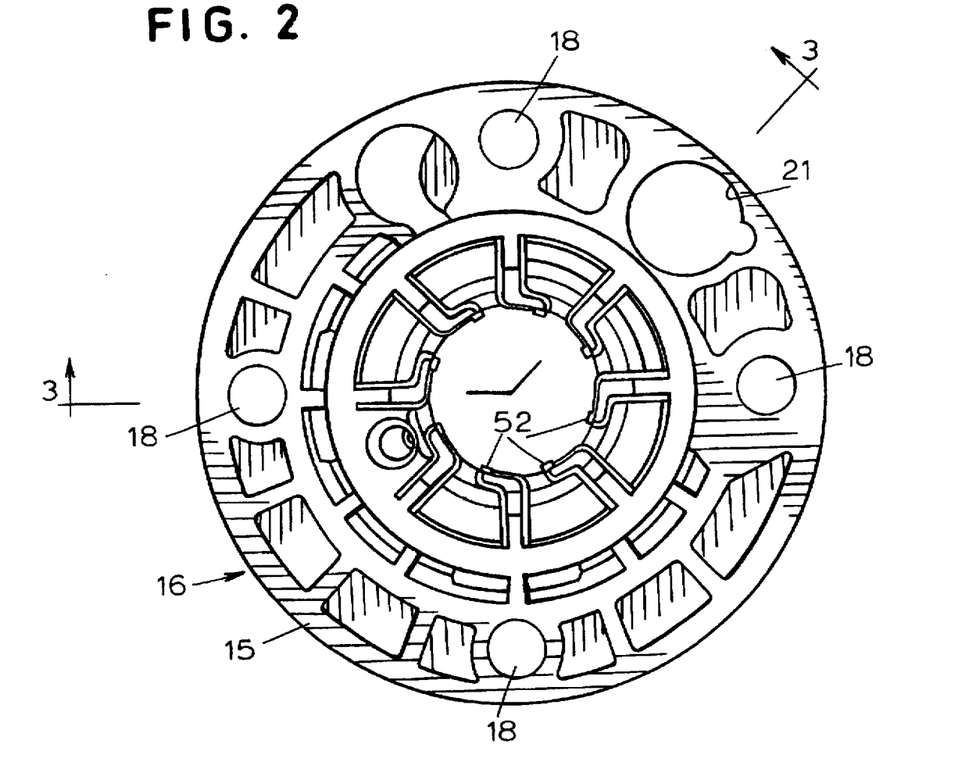
FIG. 2 is an enlarged bottom view of the end bell shown in FIG. 1.

FIG. 1 shows a submersible motor 10 including a cylindrical outer stator shell 11 which supports a stator assembly formed by laminations 12, windings 13 and an upper end ring 14. Closing the upper end of the shell 11 is an end bell 16 (see also FIGS. 2 to 5) which also forms a bearing support. The end bell 16 includes a generally disk-shaped outer cover portion 15 which is secured to the end ring 14 by a plurality of screw studs 17 (only one shown in FIG. 1) which extend through holes 18 (see FIG. 2) in the end bell 16. A sealed power cable connector 19 is mounted in a hole 21 of the end bell and in an aligned hole in the end ring 14, for connecting a power cable to the stator windings 13.

A rotor 22 (such as a squirrel cage rotor) is mounted for rotation in a rotor cavity formed by the stator. The rotor 22 includes conductors and laminations 23 secured to a rotor shaft 24. The shaft 24 extends through a central opening in the end bell 16 and splines 26 are provided for connecting the shaft to a mechanism (such as a pump) to be driven. The studs 17 also extend upwardly and are threaded for securing the motor to the driven mechanism. An adaptor (not illustrated) may be mounted between the motor and the driven mechanism.

A sand slinger 27 and a spline protector 28 may be provided on the shaft 24, and a shaft seal 29 between the end bell 16 and the shaft 24 forms a liquid tight seal. A filter-check valve 31 and an O-ring seal 32 are also provided.

A typical conventional motor includes end bells made of metal which is machined to support a bearing. Metal end bells have stable long-term mechanical stability and reliably support bearings for the rotor shaft.

In accordance with this invention, the end bell 16 is made of a composite polymer, such as AMODEL AS1133HS by AMOCO or VALOX 420HP by GE Plastics. Generally, a composite polymer has lower mechanical stability and it is subject to temperature expansion and water absorption. Further, it is subject to long-term degradation under varied environmental effects. The present construction overcomes these characteristics. The end bell includes a bearing support hub 37 that supports a journal or sleeve bearing 36 (see FIGS. 5 to 7). The bearing 36 has an inner surface 136 which engages and, of course, rotatably supports the upper end portion of the rotor shaft 24. Bearing 36 also has an outer surface 137. The bearing support hub 37 of the end bell 16 encircles the rotor shaft 24 and comprises a plurality of angularly spaced ribs 38 which extend axially and are separated by axial slots 40. The ribs 38 extend axially toward the rotor laminations 23 from the outer cover portion 15; a collar ring 41 is supported by the ribs 38 and, in turn, supports the bearing 36 as a result of the engagement of a collar ring inner periphery 138 with bearing outer surface 137.

Figure 6:
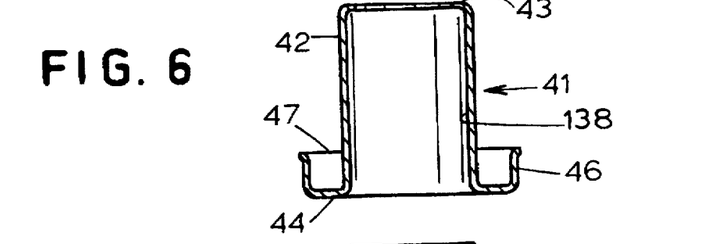
FIG. 6 is a sectional view of a bearing collar ring for use with the end bell of FIG. 4.
Figure 7:
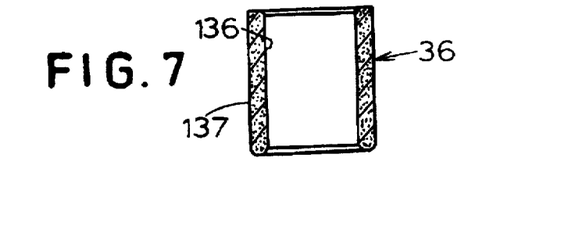
FIG. 7 is a bearing for use with the collar ring of FIG. 6.

With particular reference to FIG. 6, the collar ring 41 comprises a tubular center portion 42 which is turned radially inwardly to form a narrow flange 43 at its upper end (as seen in FIG. 6). At its lower end, the tube is turned radially outwardly to form a substantially flat radial flange 44, and then is turned axially upward and parallel with the center portion 42 as indicated by the numeral 46, thereby forming an annular cup-shaped opening 47. As shown in FIG. 1, the lower (as seen in FIG. 1) ends 48 of the ribs 38 extend into the opening 47, and the radially outer edges 56A at the lower ends of the ribs tightly engage the portions 46 of the collar ring 41. Except for tabs 52 to be described, the radially inner side of the hub is radially spaced from the center portion 42. The radial width of the opening 47 is sized such that the portions 46 flex the lower ends 48 of the ribs 38 radially inwardly to form a tight press fit connection between the lower ends 48 and the collar ring 41, so that the ring 41 will not rotate relative to the ribs 38.

It is a feature of the present invention that the provision of discrete points of engagement between the collar ring 41 and the ribs 38, and the shape of the ribs provide adequate support for the collar ring 41 while providing stress relief to maintain the stress level within an acceptable range for the composite polymer and to prevent deformation of the collar ring and the bearing therein.

The ribs 38 are essentially identical, and each includes an axially extending interior surface 51, the interior diameter between the surfaces 51 formed on a panel section 54, being greater than the outer diameter of the central portion 42 of the collar ring 41. Extending radially inwardly from the surface 51 of each panel section 54 is a tab 52, and the internal diameter between opposed tabs 52 is dimensioned relative to the outer diameter of the portion 42 of the collar ring 41 such that the tabs 52 tightly engage the ring 41. However, the remaining portions of the surfaces 51 are spaced (as indicated at 57) from the ring 41.

Figure 3:
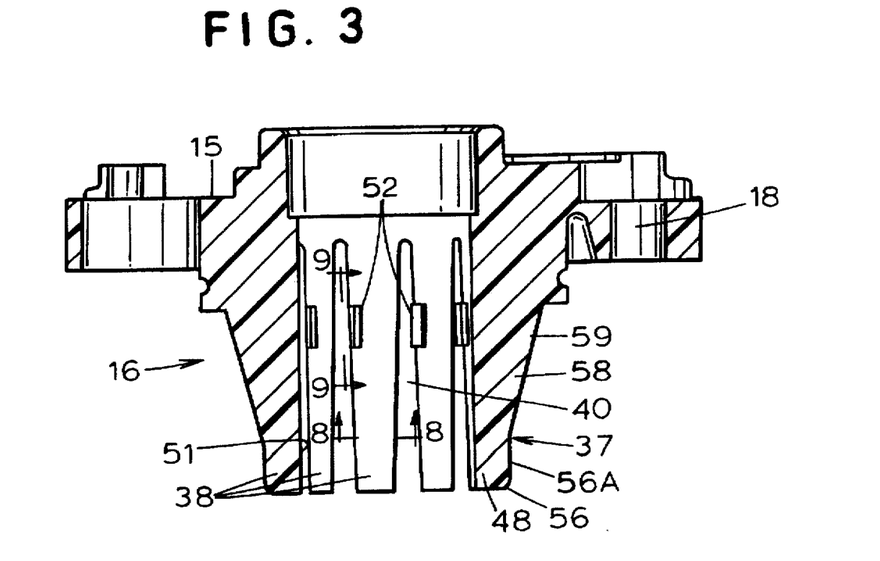
FIG. 3 is a sectional view of the end bell taken on the line 3—3 of FIG. 2.
Figure 4:
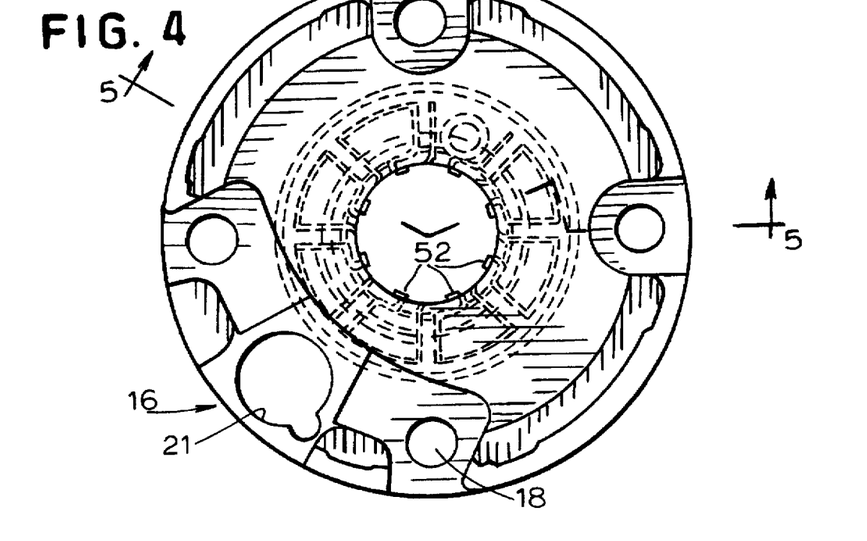
FIG. 4 is a top view of the end bell.
Figure 5:
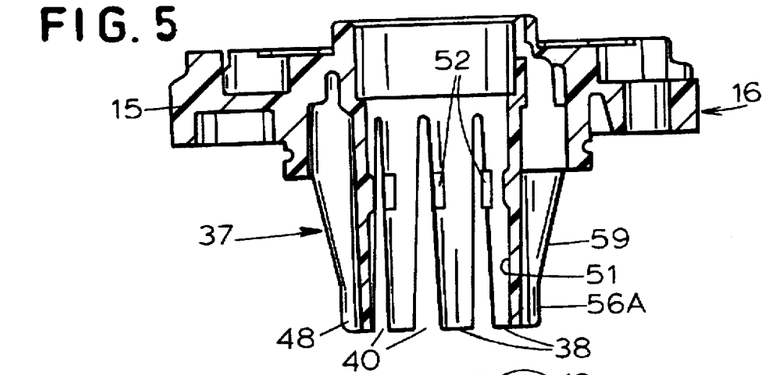
FIG. 5 is a sectional view taken on the line 5—5 of FIG. 4.
Figure 8:
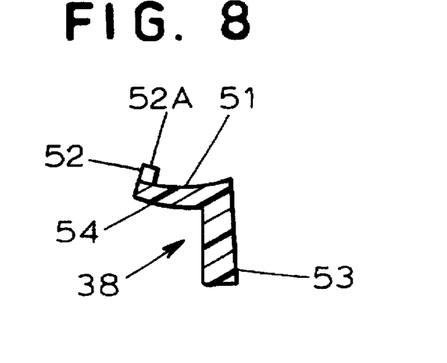
FIG. 8 is sectional view taken on the line 8—8 of FIG. 3.
Figure 9:
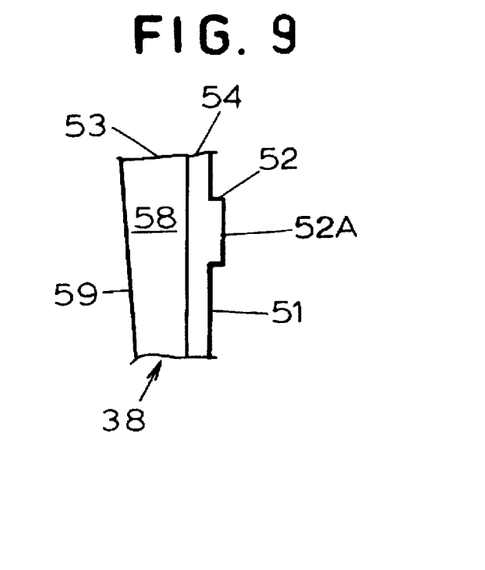
FIG. 9 is a fragmentary view taken on the line 9—9 of FIG. 3.
Figure 10:
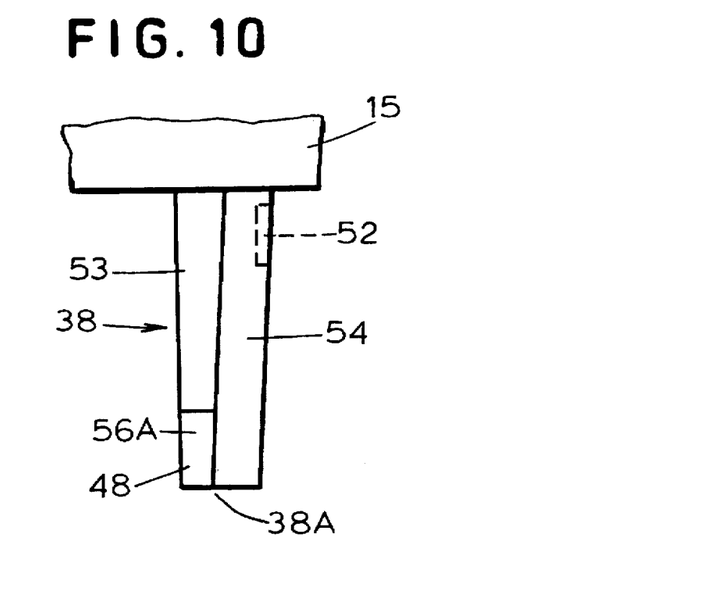
FIG. 10 is a fragmentary view taken on the line 10—10 of FIG. 5.

With specific reference to FIG. 8, for example, each rib 38 has an L-shape in cross-section and includes a radial rib section 53 and the above-mentioned circumferential panel section 54, the sections 53 and 54 being joined integrally. The panel section 54 has a substantially constant annular span throughout its vertical length, but, as shown in FIG. 3, the section 54 tapers in its circumferential dimension and is widest at its upper end adjacent the cover portion 15. The radial rib section 53 of each rib, as shown in FIG. 3 for example, has a substantially constant radial dimension in its lower inner end portion 56 (the lower end as seen in FIG. 3), and the outer end portion 56A is sized in the radial direction to form a press fit connection with the collar ring 41 as previously described. From the lower inner end portion 56, each radial rib section 53 widens in the radial direction in its intermediate portion 58 (FIGS. 3 and 9), the widening being along the radially outer tapered edge 59. In addition, as shown in FIG. 8, each radial rib section 53 has a circumferential taper and widens from its lower inner end 56 towards the cover portion 15. Further, the surfaces 51 of the panel sections 54 have a slight taper (see FIG. 3, for example) such that the internal diameter between opposing sections 54 becomes gradually smaller in the upward direction from the ends 48.

It will be apparent therefore that each radial rib section 53 gradually thickens circumferentially and radially from its lower end 48 toward the cover portion 15. The tab 52 of each rib is spaced from the juncture of the sections 53 and 54 and each rib is adjacent the opposite cantilevered edge. Thus the collar ring 41 is supported only at spaced apart discrete points. The spaced apart discrete points comprise the radially inner surfaces 52A of the tabs 52, the radially outer surfaces 56A of the end portions 48, and the end surfaces 38A of the ribs 38.

In addition to supporting the bearing 36 and the collar ring 41, the hub 37 may also be employed to support a thrust load on the rotor. With reference to FIG. 1, an annular thrust member 65 is mounted on the rotor shaft 24 adjacent the upper end of the stack of rotor laminations, and the member 65 rotates with the rotor. The upper annular surface 66 of the member 65 is normally spaced a short distance from the lower radially extending end surface 67 of the collar ring 41. However, in the event of an upwardly directed thrust load on the rotor shaft 24, the rotor including the member 65 shifts upwardly until the surface 66 of the member 65 engages the surface 67 of the collar ring 41. The fluid filling the rotor cavity functions as a lubricant for the sleeve bearing 36 and for the thrust surfaces 66 and 67.

Figure 11:
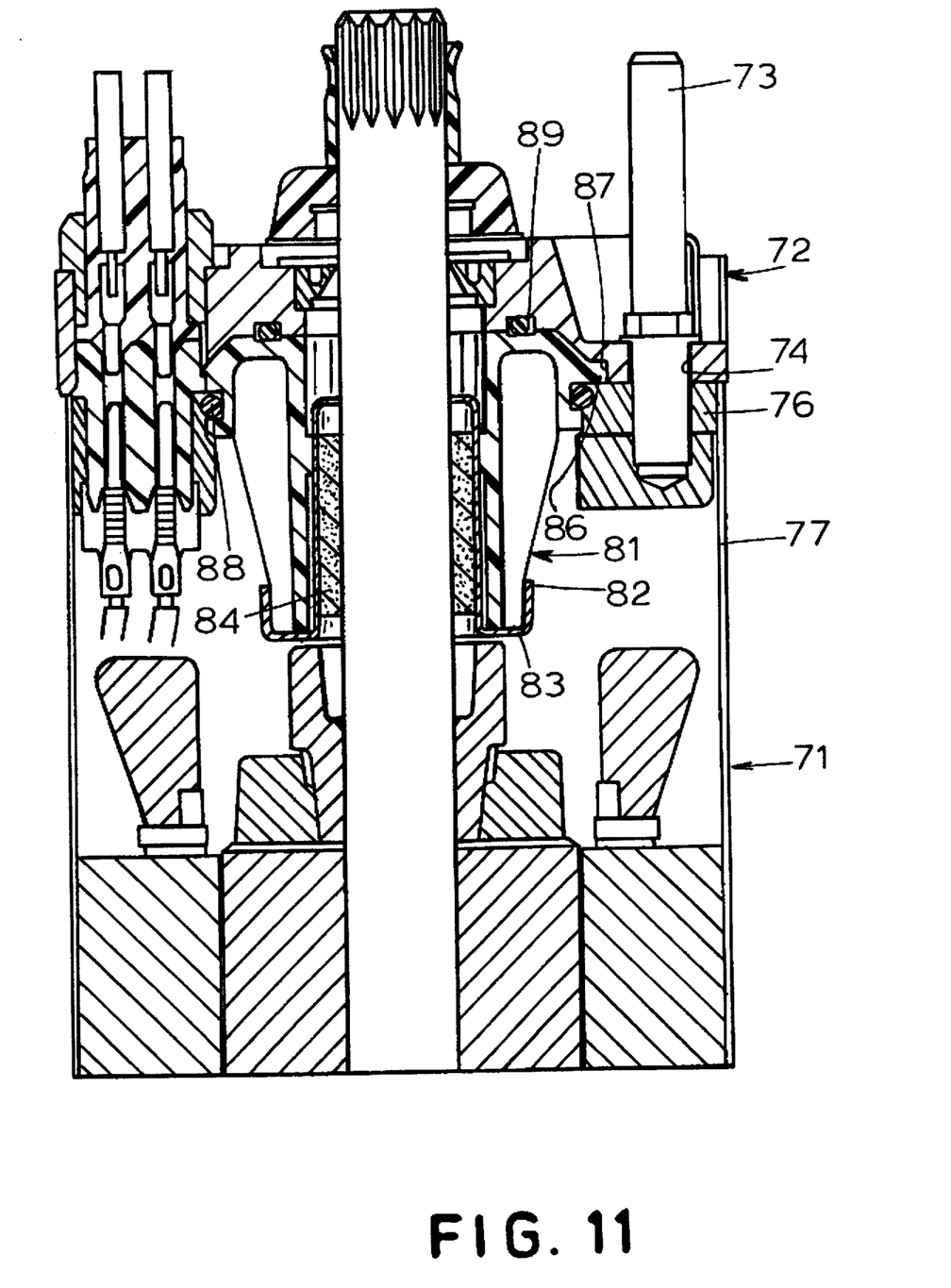
FIG. 11 is sectional view showing another construction according to the present invention.

FIGS. 1 through 10 illustrate a construction wherein the bearing support hub is formed integrally with a disk-shaped end cover part. FIG. 11 shows an alternative motor construction wherein the bearing support hub is separate from but connected to the end cover part.

In FIG. 11, the motor 71 includes a generally disk-shaped end cover 72 which is structured similarly to the outer cover part 15 shown in FIG. 1. Screw studs 73 extend through holes 74 and secure the cover 72 to an end ring 76 of the motor stator 77. In this instance, the cover 72 could be made of metal or another composite polymer different from the one used for the bearing support 81.

The motor further includes a bearing support 81 including a hub 82 and a collar ring 83 which are similar to the corresponding parts of the motor shown in FIG. 1. In this instance, the cover 72 is made of metal. The hub 82 supports a journal or sleeve bearing 84 and the hub, in turn, is supported by the end ring 76 and the cover 72. An annular radially outwardly extending flange or rib 86 is formed adjacent the upper portion of the bearing support 81, and the flange 86 rests on the upper surface of the end ring 76. An annular recess 87 is formed on the underside of the cover 72 and the groove receives the flange 86, whereby the flange is contained between the cover 72 and the end ring 76. O-rings 88 and 89 form seals between the support 81, the end ring 76 and the cover 72. As is true of the bearing support shown in FIG. 1, the bearing support 81 is preferably made of a composite polymer, such as AMODEL AS1133HS by AMOCO or VALOX 420HP by GE Plastics.

While the drawings show only the bearing support at the upper end of the motor, it will be evident that a similar bearing support may also be provided at the lower end.

It will be apparent from the foregoing that a novel and useful support for a rotary bearing has been provided. The primary features and advantages may be summarized as follows.

A support must be designed to reliably hold and support a bearing; otherwise the bearing may come loose, be free to float and, in consequence, fail. Traditionally supports are made of metal which have long-term dimensional stability. However, a support made of a nonmetal material, such as a composite polymer, is subject to dimensional changes due to heat and moisture absorption. Further, composite polymer is not as strong as most metals, and if excessively high stresses on the support are present, the polymer may be subject to creepage, relaxation and material degradation over time. Accordingly, the allowable long-term stress level for a composite polymer is relatively low.

The present invention provides a bearing support including a support hub made of a nonmetal material such as a composite polymer, and a metal collar ring, which are so designed to avoid the foregoing problems.

The hub supports the collar ring but does not contact (or apply pressure on) the bearing. The tabs 52 and lower ends 56 of the ribs contact the collar ring at spaced apart discrete locations. Excessive stress on the tabs is prevented by allowing the ribs to expand outwardly and by placing the tabs on the ribs at a location where excessive stress is avoided. In the disclosed embodiments of the invention, the tabs are displaced (cantilevered) from the radial rib sections 53, and the moment arm is such as to reduce stress concentration. (It should be noted, however, that the tabs could instead be located in line with the radial rib sections or at a location having a shorter or greater moment arm, depending on the allowable stress concentration.) At the lower inner ends 56 of the ribs, the hub is free to expand radially inwardly without applying pressure on the collar ring. Consequently the collar ring 41 is not squeezed inwardly, while it is supported and prevented from turning. The tapered clearance space of the diameter of the internal surfaces 51 also achieves stress relief.

The rigidity of the bearing support required for different composite polymers may be achieved by a design adjustment of the number of the ribs, the rib thickness, the slot spacing, and the location of the tabs 52 on the panel sections 54. The locations of the tabs 52 may be design adjusted in the circumferential direction on the panel sections 54 and in the axial direction along the lengths of the ribs 38.

Further advantages are outlined as follows:
1. The generous range of radial press fit allowance at the surfaces 56A and 52A converts to moldable tolerance in the supporting hub inner diameter and eliminates supporting hub inner diameter machining requirement.
2. The collar ring and bearing assembly is removable and replaceable as needed. The collar ring 41 may be removed from the bearing hub by pressing downwardly on the inward flange 43.

3. The unique combination of the composite polymer supporting hub with the collar ring and the bearing together yields acceptable stress levels that are essential for long-term reliability.
4. Since the collar ring directly supports the bearing and is not subject to direct influence of thermal and water and other environmental effects, the bearing is dimensionally very stable.
5. The collar ring outside surface is directly surrounded by cooling fluid, thus adding heat dissipation capacity for removing heat generated by the bearing.
6. The outwardly bending flange 44 forms a natural up thrust bearing surface and is an integral part of the collar ring, thus eliminating the need for a separate bearing washer.
7. Successful use of composite polymer for an end bell design improves corrosion resistance.
8. Successful use of composite polymer for an end bell design reduces manufacturing cost.

What is claimed is:

1. A combination bearing and support for use in a liquid pumping system comprising:

A cylindrical bearing having an inner surface for supporting a motor drive shaft and an outer surface, A composite polymer end bell, A collar ring having an inner periphery for supporting said bearing outer surface, said collar ring directly supported by said composite polymer end bell by means of supports comprising at least two discrete contact areas on said collar ring, said composite polymer end bell further comprises:

A supporting hub with a discrete number of tabs distributed on a surface characterized by a cylindrical plane adjacent to said collar ring, said discrete number of tabs engage one of said at least two discrete contact areas on said collar ring, and A discrete number of axially extending radial ribs adherent to the surface of said supporting hub.

2. A combination bearing and support for use in a liquid pumping system as set forth in claim 1,
and further including a discrete number of axial slots that separate said discrete number of axially extending radial ribs such that at least one section of the supporting hub is so constructed that it has the general shape of a supporting hub panel with one of said axially extending radial ribs attached to it.

3. A combination bearing and support for use in a liquid pumping system as set forth in claim 2,
and is further characterized in that the discrete number of tabs are intentionally combined to form one continuous ring-shaped integral tab for supporting said collar ring.

4. A combination bearing and support for use in a liquid pumping system as set forth in claim 3,
said tab on said supporting hub panel is offset certain angular degrees away from said axially extending radial rib so that both the tab on said supporting hub panel and the axially extending radial rib are not coplanar with a plane that is parallel to the axially extending radial rib and passes the center of its thickness.

5. A combination bearing and support for use in a liquid pumping system as set forth in claim 2,
said supporting hub panel is tapered in the axial direction both on the inside surface of the supporting hub and on the surfaces of the supporting hub along the axial slots, said taper on the inside surface is reversed using the tab as a parting remark.

6. A combination bearing and support for use in a liquid pumping system as set forth in claim 2,
said collar ring and said supporting hub panels are so arranged that they together create spaces between said collar ring and said supporting hub panels that result in additional collar ring surface area readily exposed to the submerging liquid surrounding said composite polymer end bell for better heat dissipation.

7. A combination bearing and support for use in a liquid pumping system as set forth in claim 2,
said discrete number of axial slots and said discrete number of supporting hub panels and said discrete number of tabs are not corresponding to each other according to exactly the same discrete number.

8. A combination bearing and support for use in a liquid pumping system as set forth in claim 2,
said tabs extending inwardly from the surface of the supporting hub panel toward the center of the bearing.

9. A combination bearing and support for use in a liquid pumping system as set forth in claim 1,
said bearing is one of a journal bearing and a rolling element bearing.

10. A combination bearing and support for use in a liquid pumping system as set forth in claim 1,
said axially extending radial ribs have substantially straight portions for engaging said collar ring at one of said at least two discrete contact areas on said collar ring.

11. A combination bearing and support for use in a liquid pumping system as set forth in claim 1,
said collar ring has an outwardly bent flange and an integral flat portion formed as part of the flange serving as the stationary running surface of an upthrust bearing, said outwardly bent flange further comprises a reverse bend from the upthrust bearing surface for engaging the axially extending radial ribs on the supporting hub of the composite polymer end bell.

12. A combination bearing and support for use in a liquid pumping system as set forth in claim 1, wherein said collar ring and said bearing are integrated into one integral part and are made of the same material.

13. A support for a bearing of a rotary electric machine, the bearing supporting the rotary shaft and having an outer surface, the shaft and the bearing having a center axis, said support comprising:

a) a tubular metal collar ring, said collar ring having an inner periphery sized to receive and support the bearing and having an outer periphery;

b) a nonmetal bearing hub having a mounting portion thereof shaped to be supported in said electric machine, said hub further including a plurality of axial ribs which extend parallel with said axis and which are angularly spaced around said outer periphery of said collar ring, said axial ribs including discrete contact surfaces which engage and support said collar ring.

14. A support for a bearing as set forth in claim 13, wherein said axial ribs are separated by axial slots.

15. A support for a bearing as set forth in claim 14, wherein each of said axial ribs has a free end and a supported end which is attached to said mounting portion, and said axial slots extend from said free ends to adjacent said supported ends.

16. A support for a bearing as set forth in claim 15, wherein each of said axial ribs has a tab which engages said collar ring and has an outer surface portion which engages said collar ring, said tabs and said outer surface portions forming said discrete contact surfaces.

17. A support for a bearing as set forth in claim 16, wherein each of said tabs extends radially inwardly and is located adjacent said mounting portion, and each of said outer surface portions is located on a radially outer side of a rib adjacent said free end of said rib.

18. A support for a bearing as set forth in claim 13, wherein each of said axial ribs includes a panel section and a radial rib section, said panel section extending substantially circumferentially and said radial rib section being joined to said panel section and extending substantially radially, and said discrete contact surfaces include tabs which extend radially inwardly from said panel sections.

19. A support for a bearing as set forth in claim 18, wherein the radially inner sides of said axial ribs are out of engagement with said collar ring except for said tabs.

20. A support for a bearing as set forth in claim 18, wherein said discrete contact surfaces further include radially outer surfaces of said radial rib sections.

21. A support for a bearing as set forth in claim 20, wherein said collar ring includes at one end thereof a radial flange and an axially extending outer flange, and said radially outer surfaces engage said outer flange.

22. A support for a bearing as set forth in claim 13, wherein said bearing hub is made of a composite polymer.

23. A support for a bearing as set forth in claim 13, wherein said mounting portion of said bearing hub forms an end bell, and said end bell including said bearing hub is made of a composite polymer.

24. A support for a bearing as set forth in claim 13, wherein said mounting portion of said bearing hub comprises a flange which is operable to be contained between an end ring and an end cover.

* * * * *